(12) United States Patent
Kagami et al.

(10) Patent No.: US 11,214,316 B2
(45) Date of Patent: Jan. 4, 2022

(54) VEHICLE BODY LOWER PART STRUCTURE

(71) Applicant: TOYOTA JIDOSHA KABUSHIKI KAISHA, Aichi-ken (JP)

(72) Inventors: Ayaka Kagami, Inazawa (JP); Soshiro Murata, Nagoya (JP); Mitsuo Kanno, Toyota (JP); Hatsumi Matsui, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 105 days.

(21) Appl. No.: 16/869,515

(22) Filed: May 7, 2020

(65) Prior Publication Data
US 2021/0001926 A1  Jan. 7, 2021

(30) Foreign Application Priority Data
Jul. 2, 2019  (JP) .............................. JP2019-123892

(51) Int. Cl.
| | |
|---|---|
| *B60J 7/00* | (2006.01) |
| *B62D 25/20* | (2006.01) |
| *B62D 27/02* | (2006.01) |
| *B62D 21/02* | (2006.01) |

(52) U.S. Cl.
CPC ............. *B62D 25/20* (2013.01); *B62D 21/02* (2013.01); *B62D 27/023* (2013.01)

(58) Field of Classification Search
CPC ....... Y02T 10/64; Y02T 10/72; Y02T 10/645; Y02T 10/70; B60L 2200/26; B60P 3/08; G07B 15/063; B62D 1/28; G01S 13/931; G01C 21/28
See application file for complete search history.

(56) References Cited

U.S. PATENT DOCUMENTS

| | | | | |
|---|---|---|---|---|
| 4,561,690 A | * | 12/1985 | Shinjo .................... | B60J 5/0409 292/336 |
| 4,898,419 A | * | 2/1990 | Kenmochi ............. | B62D 21/10 296/191 |
| 6,039,386 A | * | 3/2000 | Hasshi .................. | B62D 25/20 296/193.07 |
| 2004/0080187 A1 | | 4/2004 | Tomita | |

(Continued)

FOREIGN PATENT DOCUMENTS

| | | |
|---|---|---|
| DE | 3018811 A1 | 11/1981 |
| DE | 102010023075 A1 | 12/2011 |

(Continued)

*Primary Examiner* — Kiran B Patel
(74) *Attorney, Agent, or Firm* — Hauptman Ham, LLP (57) ABSTRACT

A vehicle body lower part structure includes: a floor panel; and a vehicle body frame member including a frame body, an inner side wall, a joint flange projecting inward in a vehicle width direction from an inner surface of the inner side wall in the vehicle width direction, and having a joining surface on which an end of the floor panel in the vehicle width direction is stacked and to which the end of the floor panel in the vehicle width direction is joined, and a recess provided to the frame body, recessed outward in the vehicle width direction from the inner surface of the inner side wall in the vehicle width direction, and having a surface that is continuous and flush with the joining surface of the joint flange.

4 Claims, 6 Drawing Sheets

(56) References Cited

U.S. PATENT DOCUMENTS

| | | | |
|---|---|---|---|
| 2010/0207426 A1 | 8/2010 | Tsuruta et al. | |
| 2011/0298246 A1 | 12/2011 | Mildner | |
| 2012/0181809 A1 | 7/2012 | Kuhl et al. | |
| 2016/0083017 A1* | 3/2016 | Sakaguchi | B62D 21/157 |
| | | | 296/187.12 |
| 2017/0088189 A1* | 3/2017 | Saeki | B62D 25/20 |
| 2017/0203792 A1* | 7/2017 | Sunohara | B62D 21/157 |
| 2018/0237075 A1* | 8/2018 | Kawabe | B60K 1/04 |
| 2019/0217742 A1* | 7/2019 | Natsume | B60N 2/0705 |
| 2019/0248423 A1* | 8/2019 | Kato | B62D 25/025 |
| 2020/0031214 A1* | 1/2020 | Matsuo | B60L 50/66 |
| 2020/0031399 A1* | 1/2020 | Matsuda | B62D 21/157 |
| 2020/0047818 A1* | 2/2020 | Ebisumoto | B62D 35/02 |
| 2020/0269928 A1* | 8/2020 | Ishimoto | B62D 21/11 |
| 2020/0282816 A1* | 9/2020 | Matsuda | B62D 21/157 |
| 2020/0361535 A1* | 11/2020 | Matsuda | B62D 21/04 |
| 2020/0385059 A1* | 12/2020 | Kubota | B62D 21/152 |
| 2021/0023923 A1* | 1/2021 | Honda | B60J 5/0427 |
| 2021/0107571 A1* | 4/2021 | Fujisawa | B60K 1/04 |
| 2021/0221441 A1* | 7/2021 | Takahashi | B62D 21/157 |
| 2021/0261202 A1* | 8/2021 | Kawashima | B62D 25/20 |

FOREIGN PATENT DOCUMENTS

| | | |
|---|---|---|
| EP | 1081025 A2 | 3/2001 |
| GB | 2072588 A | 10/1981 |
| JP | 2010173392 A | 8/2010 |
| JP | 5606539 B2 | 10/2014 |

\* cited by examiner

VEHICLE BODY LOWER PART STRUCTURE

INCORPORATION BY REFERENCE

The disclosure of Japanese Patent Application No. 2019-123892 filed on Jul. 2, 2019 including the specification, drawings and abstract is incorporated herein by reference in its entirety.

BACKGROUND

1. Technical Field

The disclosure relates to a vehicle body lower part structure.

2. Description of Related Art

There is a known structure in which a vehicle body frame member and a floor panel are provided in a vehicle body lower part (see Japanese Unexamined Patent Application Publication No. 2010-173392 (JP 2010-173392 A) and Japanese Patent No. 5606539 (JP 5606539 B)). For example, in a technique described in JP 2010-173392 A, rear side frames are provided on the right and left sides of the vehicle body rear bottom so as to extend in a front-rear direction. Each of the rear side frames is provided with a welding flange on an inner side thereof in a vehicle width direction at an intermediate portion in a vehicle up-down direction, so as to protrude inward in the vehicle width direction. To an upper surface of the welding flange, an end of a rear floor pan in the vehicle width direction is connected.

SUMMARY

In the above-described technique, for example, in consideration of variations in dimensions and arrangement position of the rear floor pan, a length of extension of the welding flange in the vehicle width direction needs to be set longer to some degree than a length of a portion of the welding flange in the vehicle width direction, on which the rear floor pan is stacked.

However, in such a configuration, the length of extension of the welding flange in the vehicle width direction tends to be long, and a space in which parts can be arranged without interfering with the welding flange accordingly decreases, which makes restriction on parts layout severer.

The disclosure provides a vehicle body lower part structure that can reduce restrictions on parts layout even when a welding flange is provided on a vehicle body frame member on a side of a floor panel.

An aspect of the disclosure relates to a vehicle body lower part structure. The vehicle body lower part structure includes a floor panel disposed in a lower part of a vehicle body and a vehicle body frame member. The vehicle body frame member includes a frame body provided on a side of the floor panel in a vehicle width direction, extending along a vehicle front-rear direction, and having an open cross section or a closed cross section, an inner side wall provided at an inner end of the frame body in the vehicle width direction and extending along a vehicle up-down direction and the vehicle front-rear direction, a joint flange projecting inward in the vehicle width direction from an inner surface of the inner side wall in the vehicle width direction, having a thickness in the vehicle up-down direction, and having a joining surface on which an end of the floor panel in the vehicle width direction is stacked and to which the end of the floor panel in the vehicle width direction is joined, and a recess provided to the frame body, recessed outward in the vehicle width direction from the inner surface of the inner side wall in the vehicle width direction, and having a surface that is continuous and flush with the joining surface of the joint flange.

The concept "extending along the vehicle front-rear direction" includes, besides a case of extending in a direction parallel to the vehicle front-rear direction, a case of extending generally in the vehicle front-rear direction although extending not exactly parallel to the vehicle front-rear direction. The wording "having an open cross section or a closed cross section" represents having an open cross section or a closed cross section as a cross section obtained by cutting along a direction orthogonal to a direction in which the frame body extends. Furthermore, the wording "projecting inward in the vehicle width direction from the inner surface of the inner side wall in the vehicle width direction" represents projecting inward in the vehicle width direction from the inner surface of the inner side wall when the inner side wall and the joint flange are seen from the same position in the vehicle front-rear direction.

In the above configuration, the joint flange projects inward in the vehicle width direction from the inner surface of the inner side wall of the frame body in the vehicle width direction and has a thickness in the vehicle up-down direction. The joint flange has the joining surface on which the end of the floor panel in the vehicle width direction is stacked and to which the end of the floor panel in the vehicle width direction is joined. Here, the frame body is provided with the recess that is recessed outward in the vehicle width direction from the inner surface of the inner side wall in the vehicle width direction, and the recess has the surface that is continuous and flush with the joining surface of the joint flange. There may be a case where an edge of the end of the floor panel in the vehicle width direction is located outward of the joining surface of the joint flange in the vehicle width direction due to, for example, variations in dimensions and arrangement position of the floor panel. Even in this case, the edge of the end of the floor panel in the vehicle width direction can be disposed in a space inside the recess. That is, the space inside the recess can be used as a space for accommodating variations in dimensions and arrangement position of the floor panel and the like. Thus, a length of the joint flange of the vehicle body frame member in the vehicle width direction can be reduced, and restrictions on parts layout can also be reduced.

In the above aspect, a non-joining surface that is on an opposite side of the joint flange from the joining surface may intersect the inner surface of the inner side wall in the vehicle width direction.

In the above configuration, a base end of the joint flange is connected to the inner side wall. Therefore, compared to the case where the base end of the joint flange is provided so as to be separated from the inner side wall both upward and downward, the joint flange is less likely to be deformed with a load applied from the floor panel side.

In the above configuration, the recess may be a recessed bead. The recessed bead may have, on an inner side of the recessed bead in the vehicle width direction, an intersection line where two surfaces of the recessed bead intersect. The intersection line may extend along a direction of extension of the frame body from an end to other end of the frame body in the direction of extension. The recessed bead may have, on an outer side of the recessed bead in the vehicle width direction, a portion provided with a ridge line extending along the intersection line.

The wording "from an end (hereinafter referred a first end) to the other end (hereinafter referred a second end) of the frame body in the direction of extension" represents "from a portion of the frame body on the first side (i.e., the first end or the vicinity thereof) to a portion of the frame body on the second side (i.e., the second end or the vicinity thereof) in the direction in which the frame body extends".

In the above configuration, the recessed bead forming the recess has, on the inner side thereof, the intersection line extending along the direction of extension of the frame body from the first end to the second end of the frame body in the direction of extension. The recessed bead also has, on the outer side thereof in the vehicle width direction, the portion provided with the ridge line extending along the intersection line. Therefore, when a load is input to the frame body in the direction of extension thereof, the frame body is less likely to be deformed.

In the above configuration, the vehicle body frame member may be made of an aluminum die-casting material. The vehicle body frame member may include a plurality of first ribs arranged side by side in the direction of extension of the frame body, the first ribs each extending along the vehicle up-down direction and integrally connecting a protruding surface of the recess and a surface inside the frame body other than the protruding surface, the protruding surface being on an opposite side of a recessed wall from a recessed surface, and the recessed wall constituting a part of the recess outward of the inner side wall in the vehicle width direction, and a second rib raised from the protruding surface, extending along the direction of extension of the frame body, and integrally connecting the first ribs adjacent to each other.

In the above configuration, the vehicle body frame member is made of an aluminum die-casting material, which facilitates formation of the first ribs and the second rib. The first ribs are arranged side by side in the direction of extension of the frame body, each extending along the vehicle up-down direction and integrally connecting the protruding surface of the recessed wall and the surface inside the frame body other than the protruding surface. Thus, when a load is applied to the vehicle body frame member in such a direction that its cross section orthogonal to the direction of extension of the vehicle body frame member deforms, deformation of portions of the recessed wall which are reinforced by the first ribs, for example, is effectively suppressed. In addition, the second rib is raised from the protruding surface, extends along the direction of extension of the frame body, and integrally connects the first ribs adjacent to each other. Thus, when a load is applied to the vehicle body frame member in such a direction that its cross section orthogonal to the direction of extension of the vehicle body frame member deforms, deformation of portions of the recessed wall which are not reinforced by the first ribs is suppressed by the second rib. That is, the first ribs and the second rib reinforce the frame body, and the deformation of the recess is effectively suppressed.

As described above, the vehicle body lower part structure according to the disclosure provides an excellent effect that the restrictions on the parts layout can be reduced even when the joint flange is provided in the vehicle body frame member on the side of the floor panel.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

A vehicle body lower part structure according to a first embodiment of the disclosure will be described with reference to FIGS. 1 to 3B. In the drawings, an arrow FR indicates a forward direction along a vehicle front-rear direction, an arrow UP indicates an upward direction along a vehicle up-down direction, an arrow W indicates a vehicle width direction, and an arrow IN indicates an inward direction along the vehicle width direction. The arrows are shown, as appropriate, in the drawings. Also, in the following, when description is made simply using terms "front-rear", "right-left", and "up-down", these terms respectively indicate, unless otherwise specified, front and rear sides in the vehicle front-rear direction, right and left sides in a vehicle right-left direction (vehicle width direction), and upper and lower sides in the vehicle up-down direction.

Figure 1:
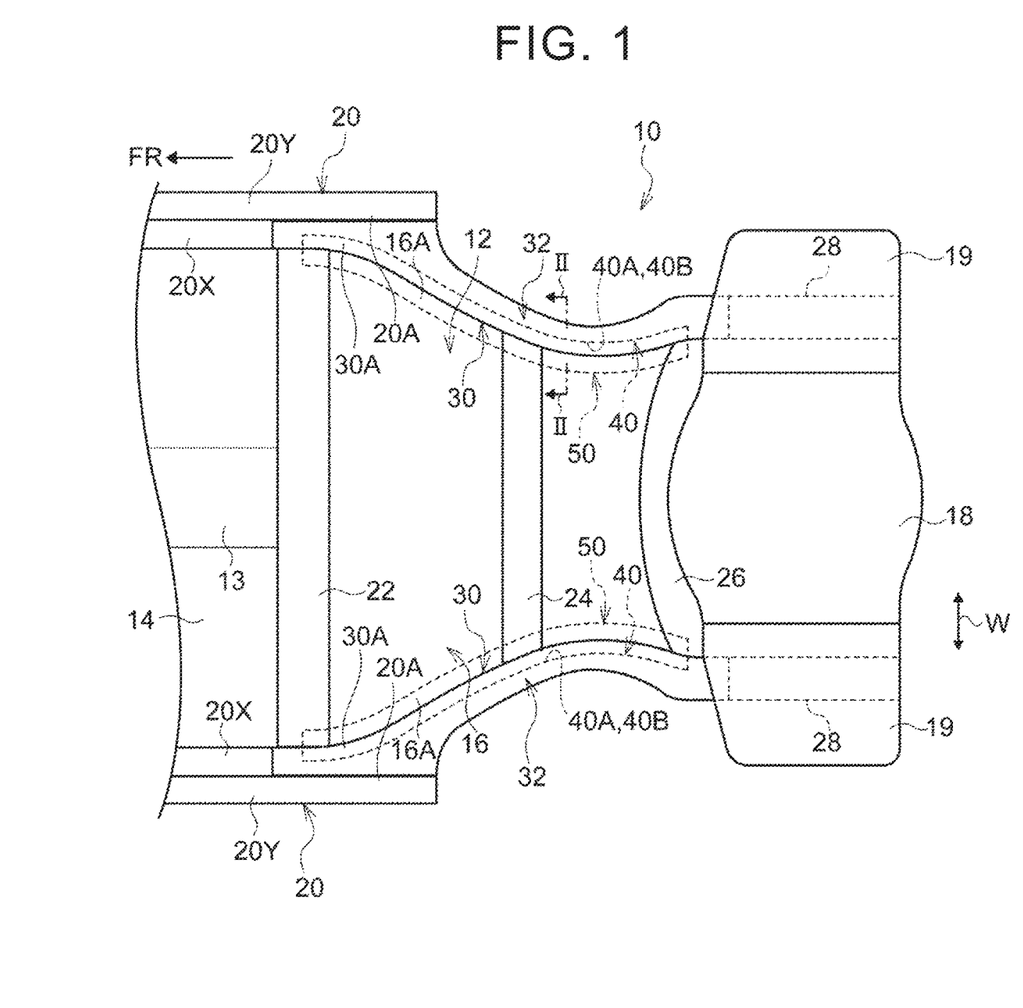
FIG. 1 is a plan view illustrating a schematic configuration of a vehicle body lower part structure according to a first embodiment of the disclosure.

FIG. 1 is a plan view illustrating a schematic configuration of the vehicle body lower part structure according to the present embodiment. As shown in FIG. 1, a floor panel 12 is arranged in a lower part 10 of the vehicle body. The floor panel 12 is a panel that constitutes a vehicle floor portion, and includes, for example, a front floor panel 14, a center floor panel 16, a rear floor panel (also referred to as "rear floor pan") 18, and rear floor side panels 19.

The front floor panel 14 constitutes a front part of the floor panel 12, and the rear floor panel 18 and the rear floor side panels 19 constitute a rear part of the floor panel 12. A floor tunnel 13 is provided at a central portion of the front part of the floor panel 12 in the vehicle width direction so as to extend in the vehicle front-rear direction and open downward in the vehicle up-down direction. The rear floor side panels 19 are connected to opposite ends of the rear floor panel 18 in the vehicle width direction. The center floor panel 16 is arranged rearward of the front floor panel 14 and connected to a rear end of the front floor panel 14, is arranged forward of the rear floor panel 18 and connected to a front end of the rear floor panel 18. Further, the center floor panel 16 is arranged forward of the rear floor side panels 19 and connected to a part of a front end, on an inner side in the vehicle width direction, of each rear floor side panel 19.

Each end of the front floor panel 14 in the vehicle width direction is joined to a rocker panel 20 (also referred to as "side sill"). The rocker panel 20 is a long-length vehicle body frame member extending along the vehicle front-rear direction and having a closed cross section. A rocker inner panel 20X constituting an inner part of the rocker panel 20 in the vehicle width direction has a cross section orthogonal to a longitudinal direction of the rocker panel 20, which has generally a hat shape with an opening facing outward in the vehicle width direction. Further, a rocker outer panel 20Y constituting an outer part of the rocker panel 20 in the vehicle width direction has a cross section orthogonal to the longitudinal direction of the rocker panel 20, which has generally a hat shape with an opening facing inward in the width direction. Upper and lower flanges of the rocker inner panel 20X and the rocker outer panel 20Y are joined together so as to form a closed cross section of the rocker panel 20. A rear end 20A of the rocker panel 20 is located outward of a front part of the center floor panel 16 in the vehicle width direction.

A front end 30A of a rear side member 30 serving as long-length vehicle body frame member is connected to the rear end 20A of the rocker panel 20 from the inner side in the vehicle width direction. The rear side member 30 is made of an aluminum die-casting material. A pair of the right and left rear side members 30 are provided at a rear side of a second-row seat (not shown) so as to extend in the vehicle front-rear direction. An intermediate portion of each rear side member 30 in its longitudinal direction is curved inward in the vehicle width direction so as to bypass a rear wheel (not shown) in a plan view of the vehicle body, and is curved so as to project upward in a side view of the vehicle body. The rear side members 30 each include a frame body 32 provided on the side of the center floor panel 16 (part of the floor panel 12) so as to extend along the vehicle front-rear direction (details will be described later). The frame body 32 may be referred to as an "outer shell". Further, opposite ends of the center floor panel 16 (part of the floor panel 12) in the vehicle width direction are joined to the rear side members 30 (details will be described later).

A first cross member 22 with its longitudinal direction coinciding with the vehicle width direction extends between front parts of the rear side members 30. The first cross member 22 is joined to the floor panel 12 (for example, the front floor panel 14 and the center floor panel 16). A second cross member 24 with its longitudinal direction coinciding with the vehicle width direction extends between intermediate pats of the rear side members 30 in the longitudinal direction. The second cross member 24 is joined to the floor panel 12 (more specifically, the center floor panel 16). A third cross member 26 with its longitudinal direction coinciding with the vehicle width direction extends between rear parts of the rear side members 30. The third cross member 26 is joined to the floor panel 12 (for example, the center floor panel 16, the rear floor panel 18, and the rear floor side panels 19).

Front ends of long-length rear floor side members 28 are connected to rear ends of the rear side members 30. The pair of right and left rear floor side members 28 are the vehicle body frame members extending along the vehicle front-rear direction. The rear floor side members 28 are joined to lower surfaces of the rear floor side panels 19.

Figure 2:
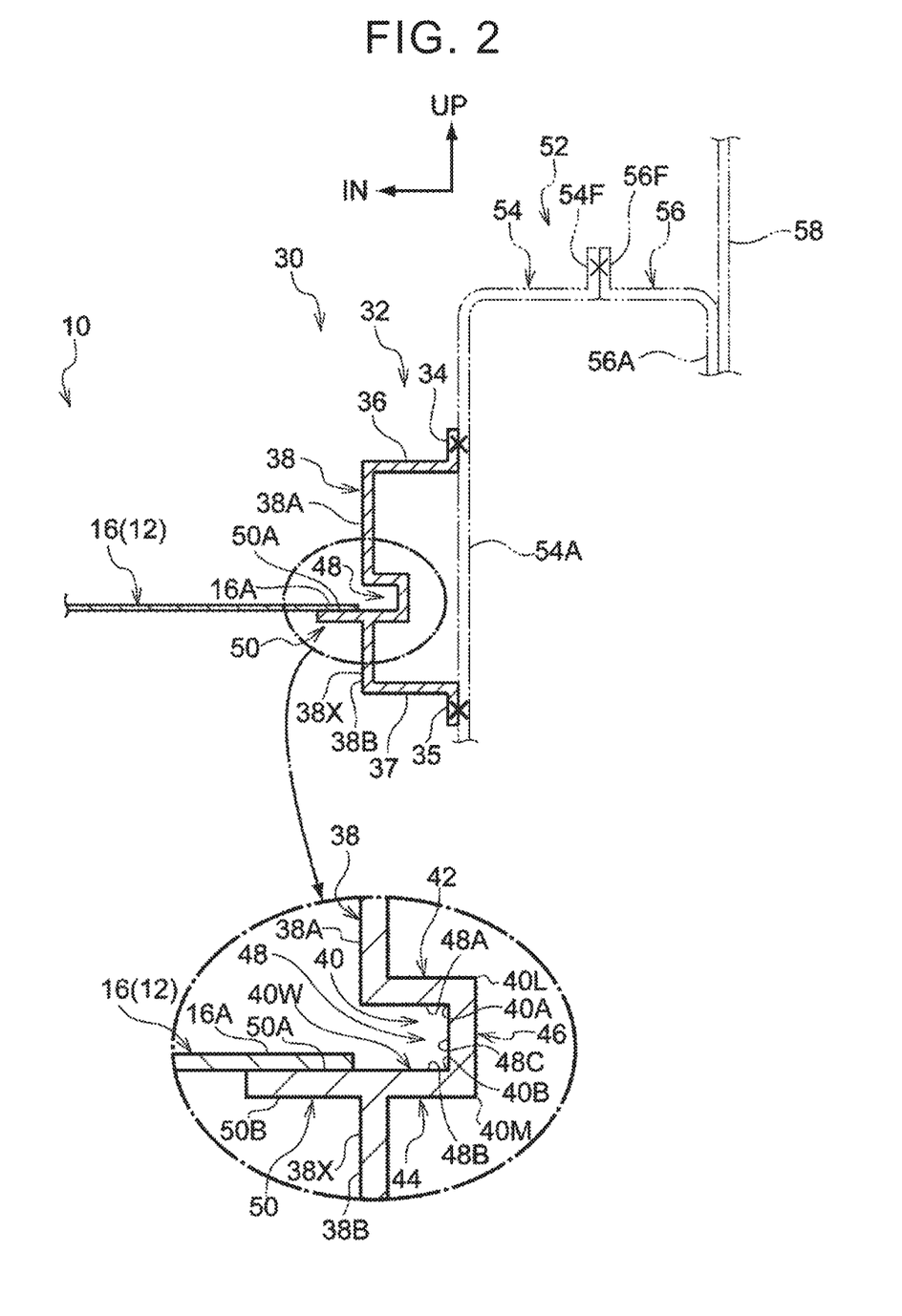
FIG. 2 is an enlarged vertical sectional view taken along line II-II in FIG. 1.

FIG. 2 is an enlarged vertical sectional view taken along line II-II in FIG. 1. As shown in FIG. 2, the frame body 32 of the rear side member 30 has an open cross section, more specifically, a generally hat-shaped cross section with an opening facing outward in the vehicle width direction, as seen in a vertical sectional view from a vehicle rear side (detailed shape will be described later).

An upper part of the frame body 32 includes an upper flange 34 and an upper wall 36. The upper flange 34 extends along the vehicle up-down direction and the vehicle front-rear direction. The upper wall 36 extends inward in the vehicle width direction from a lower end of the upper flange 34 so as to form a bend together with the upper flange 34. A lower part of the frame body 32 includes a lower flange 35 and a lower wall 37. The lower flange 35 extends along the vehicle up-down direction and the vehicle front-rear direction. The lower wall 37 extends inward in the vehicle width direction from an upper end of the lower flange 35 so as to form a bend together with the lower flange 35.

An intermediate part of the frame body 32 in the vehicle up-down direction is configured to include an inner side wall 38 provided at an inner end of the frame body 32 in the vehicle width direction so as to extend along the vehicle up-down direction and the vehicle front-rear direction. In the cross section of FIG. 2, the inner side wall 38 is divided in the vehicle up-down direction. However, at the front end and the rear end of the frame body 32, the inner side wall 38 is not divided in the vehicle up-down direction but is continuous in the vehicle up-down direction. The inner side wall 38 extends downward in the vehicle up-down direction from an inner end of the upper wall 36 in the vehicle width direction so as to form a bend together with the upper wall 36, and extends upward in the vehicle up-down direction from an inner end of the lower wall 37 in the vehicle width direction so as to form a bend together with the lower wall 37. In the following description, a portion of the inner side wall 38 upward of the dividing portion is referred to as an inner side wall upper portion 38A, and a portion of the inner side wall 38 downward of the dividing portion is referred to as an inner side wall lower portion 38B. A portion connecting the inner side wall upper portion 38A and the inner side wall lower portion 38B will be described later in detail.

A side wall MA of a wheelhouse inner panel 54 on the inner side in the vehicle width direction is stacked on the upper flange 34 and the lower flange 35 of the frame body 32 from outside in the vehicle width direction and joined thereto. The frame body 32 and the wheelhouse inner panel 54 are joined together in this manner, so that a closed cross section seen in the vehicle front-rear direction is formed. The wheelhouse inner panel 54 is a component of a rear wheelhouse 52 on the inner side in the vehicle width direction. The rear wheelhouse 52 is a member that covers an upper part of a rear wheel (not shown), and includes a wheelhouse outer panel 56 serving as a component on the outer side in the vehicle width direction. An upper flange 54F of the wheelhouse inner panel 54 and an upper flange 56F of the wheelhouse outer panel 56 are joined together to form the rear wheelhouse 52. A lower end of a side outer panel (also referred to as "side member outer panel") 58 constituting an outer panel of a vehicle body side part is joined to a side wall 56A of the wheelhouse outer panel 56 on the outer side in the vehicle width direction from outside in the vehicle width direction.

The rear side member 30 includes a joint flange 50 that projects inward in the vehicle width direction from a vehicle width direction inner surface 38X of the inner side wall 38 of the frame body 32. The joint flange 50 is disposed with its thickness direction coinciding with the vehicle up-down direction. As shown in FIG. 1, the joint flange 50 extends along a direction of extension of the rear side member 30, from a first end to a second end of the rear side member 30 in the direction of extension thereof.

As shown in FIG. 2, the joint flange 50 has a joining surface 50A on which an end 16A of the center floor panel 16 of the floor panel 12 in the vehicle width direction is stacked from above and to which the end 16A is joined. In the present embodiment, the joint flange 50 and the end 16A of the center floor panel 16 in the vehicle width direction are joined to each other with an adhesive and rivets (both not shown). The joint flange 50 is provided to extend continuously at an upper end of the inner side wall lower portion 38B. As shown in the partially enlarged view in FIG. 2, a non-joining surface 50B, which is on the opposite side of the joint flange 50 from the joining surface 50A, intersects the vehicle width direction inner surface 38X of the inner side wall 38 (more specifically, the inner side wall lower portion 38B).

Further, the frame body 32 is provided with a recess 48 that is recessed outward in the vehicle width direction from the vehicle width direction inner surface 38X of the inner side wall 38. The recess 48 is formed of a recessed bead 40. The recessed bead 40 includes a recessed wall 40W that constitutes a part of the recess 48 outward of the inner side wall 38 in the vehicle width direction.

The recessed wall 40W includes a first wall 42, a second wall 44, and a third wall 46. The first wall 42 and the second wall 44 face each other in the vehicle up-down direction. The third wall 46 connects, in the vehicle up-down direction, an outer end of the first wall 42 in the vehicle width direction and an outer end of the second wall 44 in the vehicle width direction. The first wall 42 extends outward in the vehicle width direction from a lower end of the inner side wall upper portion 38A. The second wall 44 extends outward in the vehicle width direction from an upper end of the inner side wall lower portion 38B. The recessed wall 40W also includes a front end wall and a rear end wall (both not shown). The front end wall connects front ends of the first wall 42, the second wall 44, and the third wall 46. The rear end wall connects rear ends of the first wall 42, the second wall 44, and the third wall 46.

Figure 3A:
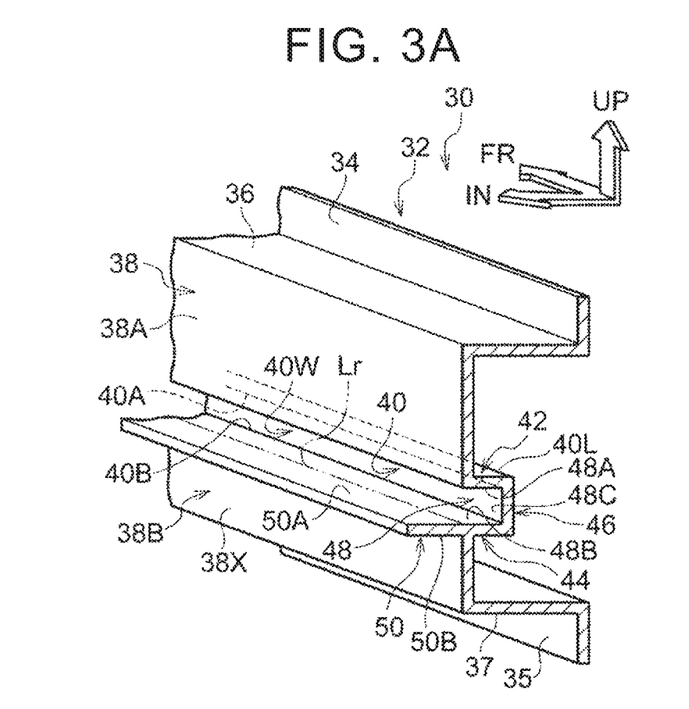
FIG. 3A is a perspective view showing, in a simplified manner, a part of a rear side member applied to the vehicle body lower part structure in FIG. 1, as seen obliquely from upward of a vehicle and an inner side in a vehicle width direction.
Figure 3B:
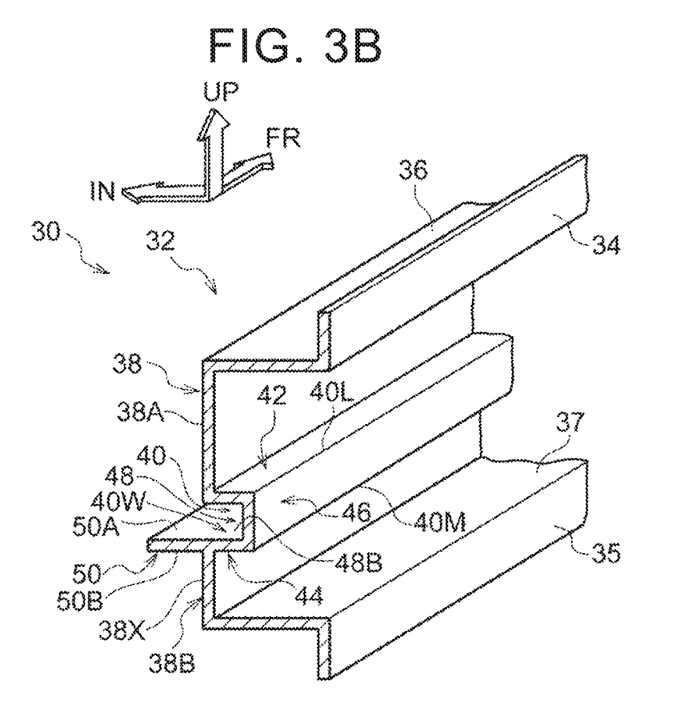
FIG. 3B is a perspective view showing, in a simplified manner, the part of the rear side member applied to the vehicle body lower part structure in FIG. 1, as seen obliquely from upward of the vehicle and an outer side in the vehicle width direction.

FIGS. 3A and 3B each show a part of the rear side member 30 in a perspective view. FIG. 3A is a perspective view showing the rear side member 30, as seen obliquely from upward of the vehicle and an inner side in a vehicle width direction. FIG. 3B is a perspective view showing the rear side member 30, as seen obliquely from upward of the vehicle and an outer side in the vehicle width direction. The rear side member 30 has a slightly curved shape as shown in FIG. 1. However, in FIGS. 3A and 3B, the rear side member 30 is shown in a straight shape in a simplified manner for convenience.

As shown in FIG. 3A, an inner surface of the recess 48 has a first surface 48A at an upper end thereof, a second surface 48B at a lower end thereof, and a third surface 48C at an outer end thereof in the vehicle width direction. The first surface 48A faces downward, the second surface 48B faces upward, and the third surface 48C faces inward in the vehicle width direction. The second surface 48B of the recess 48 is continuous and flush with the joining surface 50A of the joint flange 50. In FIG. 3A, a boundary between the second surface 48B of the recess 48 and the joining surface 50A of the joint flange 50 is indicated, for convenience, by a long dashed double-short dashed line Lr to make the drawing easy to see.

The recessed bead 40 is provided with, on the inner side thereof, an upper intersection line 40A where the first surface 48A and the third surface 48C intersect and a lower intersection line 40B where the third surface 48C and the second surface 48B intersect. As shown in FIG. 1, the intersection lines 40A, 40B extend along the direction of extension of the frame body 32 from the first end to the second end of the frame body 32 in the direction of extension.

As shown in FIG. 3B, the recessed bead 40 of the rear side member 30 is provided with, on an outer side thereof in the vehicle width direction, an upper ridge line 40L at a connection portion between the first wall 42 and the third wall 46 and a lower ridge line 40M at a connection portion between the third wall 46 and the second wall 44. That is, the recessed bead 40 has, on the outer side thereof in the vehicle width direction, portions where the ridge lines 40L, 40M are formed to extend along the intersection lines 40A, 40B (see FIG. 3A). Similarly to the intersection lines 40A, 40B, the ridge lines 40L, 40M extend along the direction of extension of the frame body 32 from the first end to the second end of the frame body 32 in the direction of extension.

Operations and Effects

Next, operations and effects of the present embodiment will be described.

In the first embodiment, the frame body 32 shown in FIG. 2 and the like is provided with the recess 48 recessed outward in the vehicle width direction from the vehicle width direction inner surface 38X of the inner side wall 38. The recess 48 includes the second surface 48B that is continuous and flush with the joining surface 50A of the joint flange 50. There may be a case where an edge of the end 16A of the center floor panel 16 in the vehicle width direction is located outward of the joining surface 50A of the joint flange 50 in the vehicle width direction due to, for example, variations in dimensions and arrangement position of the center floor panel 16. Even in this case, the edge of the end 16A of the center floor panel 16 in the vehicle width direction can be disposed in a space inside the recess 48. That is, the space inside the recess 48 can be used as a space for accommodating variations in dimensions and arrangement position of the center floor panel 16 and the like. Thus, for example, a length of the joint flange 50 of the rear side member 30 in the vehicle width direction can be reduced as compared with a comparative structure in which the recess 48 is not provided. Accordingly, compared with the comparative structure, a space in which the parts can be arranged without interfering with the joint flange 50 is enlarged, and restrictions on parts layout are reduced.

In addition, in the comparative structure, a length of extension of the joint flange in the vehicle width direction needs to be set longer to some degree than a length, in the vehicle width direction, of the portion of the joint flange on which the floor panel is stacked. In other words, in the comparative structure, the joint flange has an extra length to secure a clearance between the edge of the floor panel in the vehicle width direction and the inner side wall of the frame body. For the above, the following two reasons are conceivable, for example, besides the reason that variations in dimensions and arrangement position of the floor panel need to be taken into account.

(1) A sealer for water intrusion prevention needs to be applied so as to cover a boundary between an outer end face of the floor panel in the vehicle width direction and the joint flange, and thus, it is necessary to provide a base end of the joint flange with a portion on which the floor panel is not stacked.

(2) In the process of manufacture, a curved surface is formed on the base end of the joint flange, which is not flush with the joining surface of the joint flange and has a curve projecting toward the inner side wall, so that it is necessary to extend the length of extension of the joint flange by at least an amount corresponding to the curved surface.

In the comparative structure, besides the parts themselves, components provided on the floor panel for parts arrangement are also subject to positional restrictions to a degree corresponding to the length of extension of the joint flange in the vehicle width direction. Examples of the components provided on the floor panel for parts arrangement include through-holes, projections, and recesses formed in the floor panel, stud bolts fixed to the floor panel, etc. The through-holes are provided for routing of an air conditioner duct and wire harnesses by passing them through the through-holes.

In contrast, in the present embodiment, by forming the recess 48, it is only necessary to secure the length of the joint flange 50 of the rear side member 30 in the vehicle width direction, which allows the end 16A of the center floor panel 16 in the vehicle width direction to be stacked on the joint flange 50. Thus, the length of the joint flange 50 of the rear side member 30 in the vehicle width direction can be minimized, and the restrictions on the parts layout become smaller than those on the comparative structure.

As described above, in the vehicle body lower part structure of the present embodiment, even when the joint flange 50 is provided to the rear side member 30 on the side of the center floor panel 16, the restrictions on the parts layout can be reduced.

Figure 6:
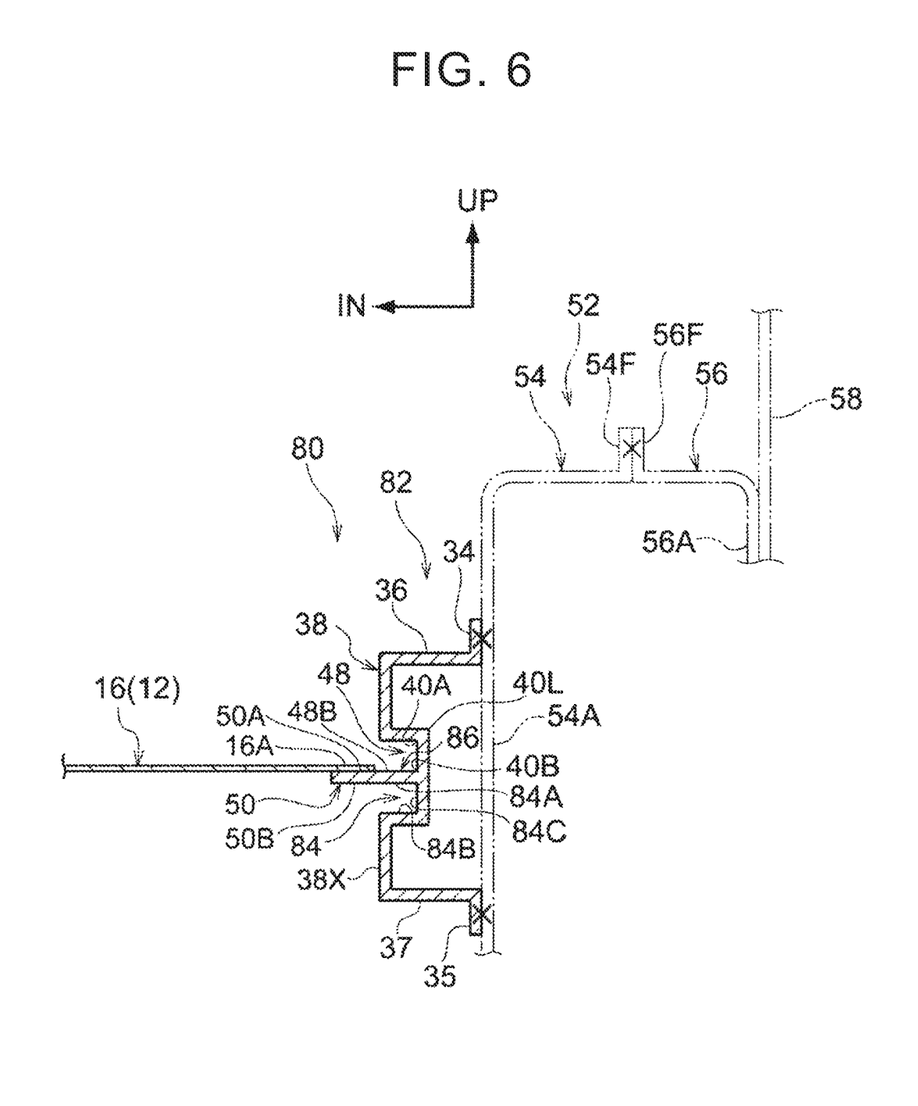
FIG. 6 is a vertical sectional view showing a vehicle body lower part structure according to a fourth embodiment of the disclosure.

In the present embodiment, the non-joining surface 50B, which is the surface on the opposite side of the joint flange 50 from the joining surface 50A, intersects the vehicle width direction inner surface 38X of the inner side wall 38 (more specifically, the inner side wall lower portion 38B). Thus, a base end of the joint flange 50 is connected to the inner side wall 38. Therefore, for example, compared to the case where the base end of the joint flange (50) is provided so as to be separated from the inner side wall (38) both upward and downward (see FIG. 6 showing a fourth embodiment described later), the joint flange 50 is less likely to be deformed with a load applied from the center floor panel 16 side.

Further, in the present embodiment, the recessed bead 40 forming the recess 48 shown in FIG. 3A has, on the inner side thereof, the intersection lines 40A, 40B extending along the direction of extension of the frame body 32 from the first end to the second end of the frame body 32 in the direction of extension. The recessed bead 40 shown in FIG. 3B has, on the outer side thereof in the vehicle width direction, the portions where the ridge lines 40L, 40M are formed to extend along the intersection lines 40A, 40B (see FIG. 3A). Therefore, when a load is input to the frame body 32 in the direction of extension thereof (in other words, in a direction of an axial force of the rear side member 30), the frame body 32 is less likely to be deformed. That is, the sectional strength of the frame body 32 can be improved.

Second Embodiment

Figure 4A:
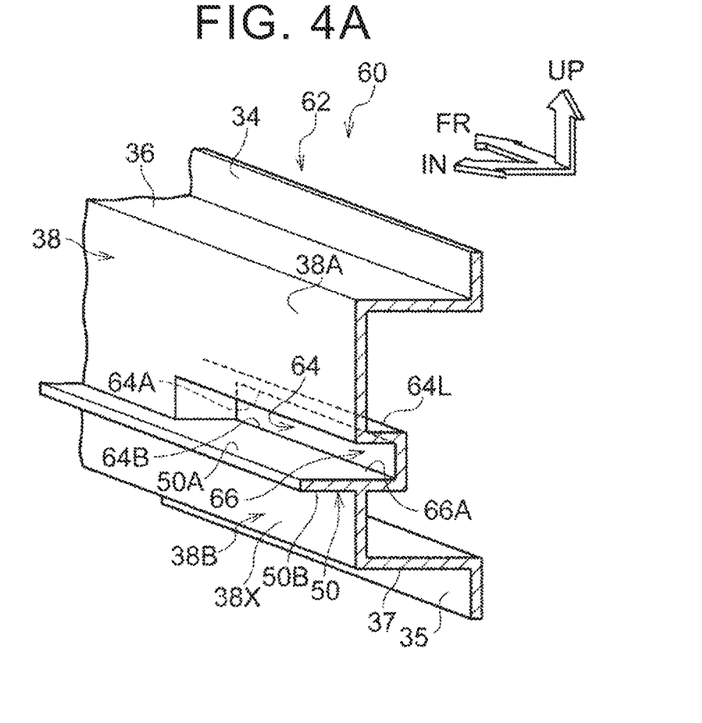
FIG. 4A is a perspective view showing, in a simplified manner, a part of a rear side member applied to a vehicle body lower part structure according to a second embodiment of the disclosure, as seen obliquely from upward of the vehicle and the inner side in the vehicle width direction.
Figure 4B:
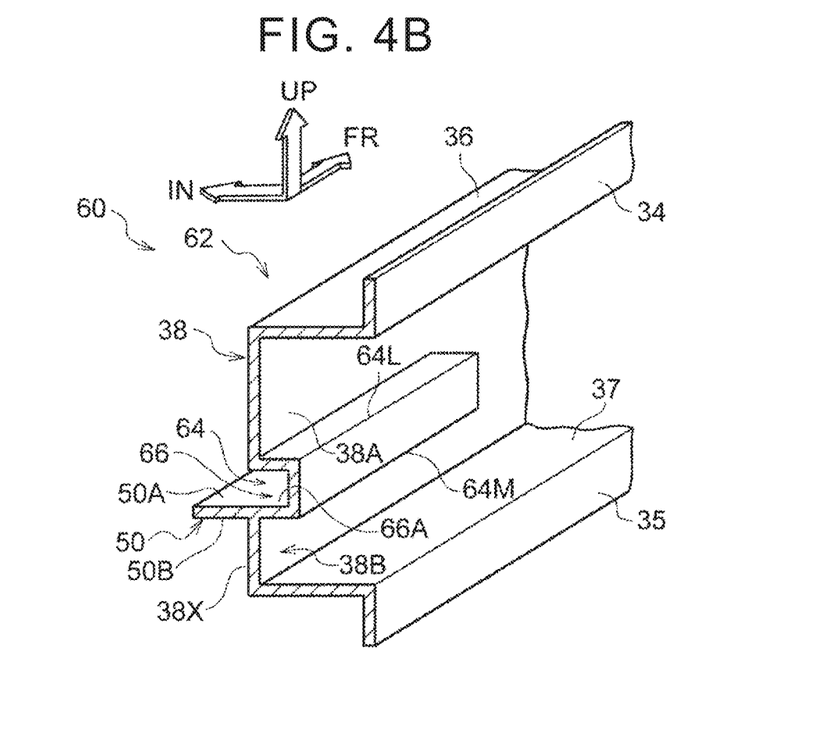
FIG. 4B is a perspective view showing, in a simplified manner, the part of the rear side member applied to the vehicle body lower part structure according to the second embodiment of the disclosure, as seen obliquely from upward of the vehicle and the outer side in the vehicle width direction.

Next, a vehicle body lower part structure according to a second embodiment of the disclosure will be described with reference to FIGS. 4A and 4B. FIGS. 4A and 4B each show, in a simplified perspective view, a part of a rear side member 60 serving as a vehicle body frame member applied to the vehicle body lower part structure according to the present embodiment. FIG. 4A is a drawing corresponding to FIG. 3A in the first embodiment, and FIG. 4B is a drawing corresponding to FIG. 3B in the first embodiment. The present embodiment has substantially the same configuration as that of the first embodiment except for the points described below. Thus, components substantially the same as those of the first embodiment are denoted by the same reference signs, and the description thereof will be omitted.

The present embodiment is different from the first embodiment in that a frame body 62 of the rear side member 60 is provided with a plurality of recesses 66 discontinuously along the direction of extension of the frame body 62. Other components of the frame body 62 are configured to be substantially the same as those of the frame body 32 (see FIGS. 3A and 3B, etc.) in the first embodiment. A floor panel (not shown) applied to the present embodiment is basically the same as the floor panel 12 (see FIG. 1) in the first embodiment. However, the floor panel of the present embodiment is provided with a plurality of projecting portions projecting outward in the vehicle width direction from an end thereof in the vehicle width direction. Positions of the recesses 66 in the vehicle front-rear direction are set so as to match positions of the projecting portions of the floor panel in the vehicle front-rear direction.

The projecting portions of the floor panel are stacked on the joining surface 50A of the joint flange 50 of the rear side member 60 and joined thereto with an adhesive and rivets (both not shown). In addition, portions, other than the projecting portions, of the ends of the floor panel in the vehicle width direction are also stacked on the joining surface 50A of the joint flange 50 and joined thereto with an adhesive and rivets (both not shown). The floor panel is basically configured such that rivet joint portions are provided at the ends of the floor panel in the vehicle width direction so as to be arranged in line along the vehicle front-rear direction, but for locations where such arrangement is difficult due to the positional relationship with the peripheral parts, the projecting portions are provided.

The recesses 66 are each configured substantially the same as the recess 48 (see FIG. 3A) of the first embodiment, for the points other than the above. The recesses 66 are recessed outward in the vehicle width direction from the vehicle width direction inner surface 38X of the inner side wall 38 and has a surface 66A that is continuous and flush with the joining surface 50A of the joint flange 50.

Further, a plurality of recessed beads 64 forming the recesses 66 are provided discontinuously along the direction of extension of the frame body 62. The recessed beads 64 are configured the same as the recessed bead 40 (see FIG. 3B) in the first embodiment for the points other than the above. On the inner side of the recessed bead 64, intersection lines 64A, 64B (see FIG. 4A) where the two surfaces intersect extend along the direction of extension of the frame body 62. The recessed bead 64 has, on the outer side thereof in the vehicle width direction, ridge lines 64L, 64M (see FIG. 4B) extending along the intersection lines 64A, 64B.

Also with the present embodiment, the space inside the recess 66 can be used as a space for accommodating variations in dimensions and arrangement position of the floor panel 16 and the like. Thus, the length of the joint flange 50 of the rear side member 60 in the vehicle width direction can be minimized, and the restrictions on the parts layout can be reduced.

Third Embodiment

Figure 5:
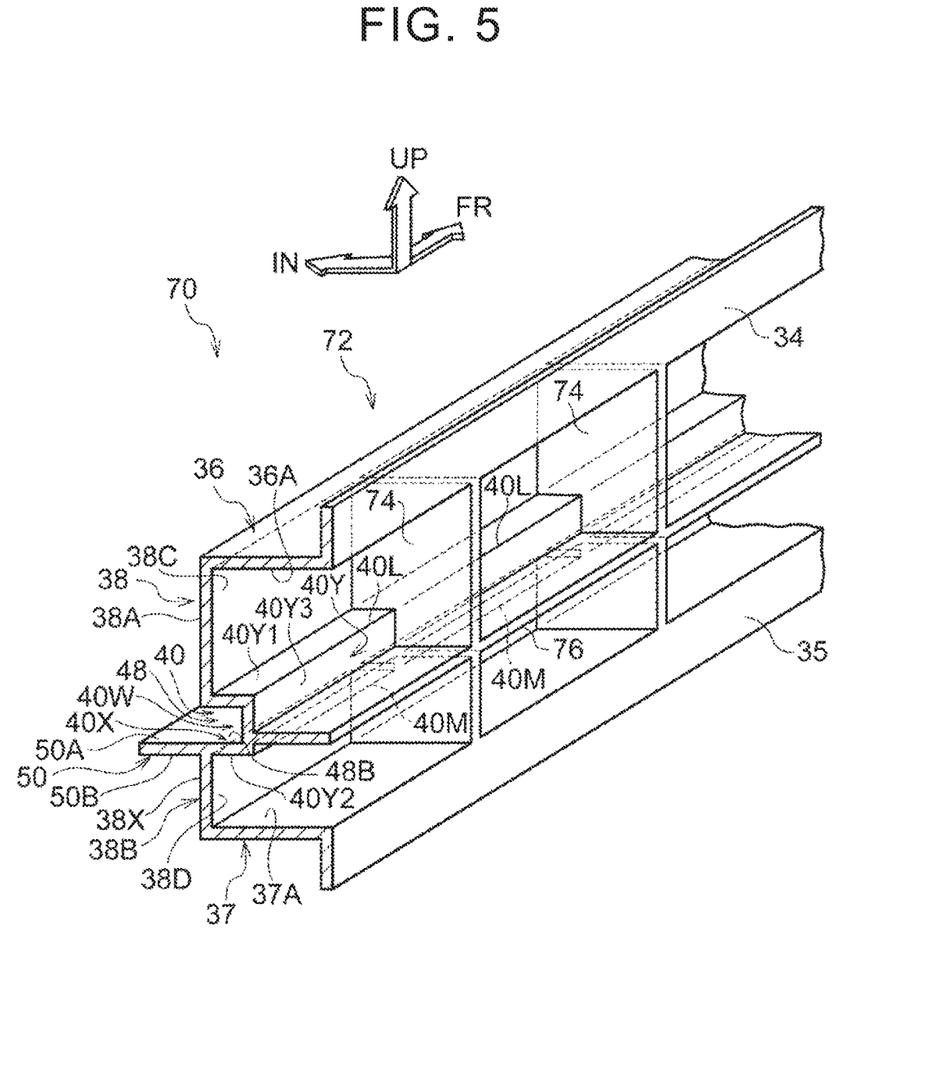
FIG. 5 is a perspective view showing, in a simplified manner, a part of a rear side member applied to a vehicle body lower part structure according to a third embodiment of the disclosure, as seen obliquely from upward of the vehicle and the outer side in the vehicle width direction.

Next, a vehicle body lower part structure according to a third embodiment of the disclosure will be described with reference to FIG. 5. FIG. 5 is a perspective view showing a part of a rear side member 70 serving as a vehicle body frame member applied to the vehicle body lower part structure according to the present embodiment, as seen obliquely from upward of the vehicle and the outer side in the vehicle width direction. The rear side member 70 has a slightly curved shape like the rear side member 30 shown in FIG. 1. However, in FIG. 5, the rear side member 70 is shown in a straight shape in a simplified manner for convenience.

The present embodiment is different from the first embodiment in that a frame body 72 of the rear side member 70 is provided with first ribs 74 and a second rib 76, as shown in FIG. 5. Other configurations are substantially the same as those of the first embodiment. Thus, components substantially the same as those of the first embodiment are denoted by the same reference signs, and the description thereof will be omitted. The frame body 72 of the present embodiment is configured the same as the frame body 32 of the first embodiment (see FIGS. 3A and 3B, etc.) except that the first ribs 74 and the second rib 76 are formed.

The rear side member 70 is made of an aluminum die-casting material, and has the first ribs 74 arranged side by side in the direction of extension of the frame body 72. The first ribs 74 each extend along the vehicle up-down direction and the vehicle width direction so as to integrally connect a protruding surface 40Y, which is on the opposite side of the recessed wall 40W from a recessed surface 40X, and surfaces 36A, 38C, 38D, 37A inside the frame body 72 other than the protruding surface 40Y.

The protruding surface 40Y includes an upper surface 40Y1, a lower surface 40Y2, and a vehicle width direction outer surface 40Y3. In the drawing, reference sign 36A indicates a lower surface of the upper wall 36, reference sign 38C indicates a vehicle width direction outer surface of the inner side wall upper portion 38A, reference sign 38D indicates a vehicle width direction outer surface of the inner side wall lower portion 38B, and reference sign 37A indicates an upper surface of the lower wall 37. The ridge lines 40L, 40M in FIG. 5 are different from the ridge lines 40L, 40M of the first embodiment (see FIG. 3B) in that the ridge lines 40L, 40M in FIG. 5 are each divided in the vehicle front-rear direction at portions where the first ribs 74 are formed. However, the ridge lines 40L, 40M in FIG. 5 are the same as the ridge lines 40L, 40M of the first embodiment for the other points, so the same reference signs are used for both.

The rear side member 70 includes a second rib 76 raised from the vehicle width direction outer surface 40Y3 of the protruding surface 40Y and extending along the direction of extension of the frame body 72. The second rib 76 integrally connects the first ribs 74 adjacent to each other.

According to the present embodiment, when a load is applied to the rear side member 70 in such a direction that its cross section orthogonal to the direction of extension deforms, deformation of portions of the recessed wall 40W which are reinforced by the first ribs 74, for example, is effectively suppressed. In addition, when a load is applied to the rear side member 70 in such a direction that its cross section orthogonal to the direction of extension deforms, deformation of portions of the recessed wall 40W, which are not reinforced by the first ribs 74, is suppressed by the second rib 76. That is, according to the present embodiment, the same operations and effects as those of the above-described first embodiment can be obtained, and further, the frame body 72 is reinforced by the first ribs 74 and the second rib 76, so that the deformation of the recess 48 is effectively suppressed. In addition, the rear side member 70 is made of an aluminum die-casting material, which facilitates formation of the first ribs 74 and the second rib 76.

Here, formation of the ribs will be supplementarily described by taking a comparative structure as an example. The comparative structure is a structure in which each end of the floor panel in the vehicle width direction is joined to a rear side member that is made of an aluminum die-casting material but does not have the joint flange 50 and the recess 48. In the comparative structure, the end of the floor panel in the vehicle width direction is stacked on the inner side wall of the rear side member and joined thereto. In this case, a portion to be joined is sandwiched by a pair of joint guns in the vehicle width direction at the time of joining. Therefore, even inside the frame body of the rear side member, ribs cannot be formed at a portion where the joint gun is disposed at the time of joining, in order to avoid interference. In contrast, in the present embodiment, the rear side member 70 has the joint flange 50. Therefore, it is not necessary to dispose the joint gun inside the frame body 72, so that the first ribs 74 and the second rib 76 can be formed inside the frame body 72.

Fourth Embodiment

Next, a vehicle body lower part structure according to a fourth embodiment of the disclosure will be described with reference to FIG. 6. FIG. 6 shows a vehicle body lower part structure according to the present embodiment in a vertical sectional view (corresponding to FIG. 2 of the first embodiment). As shown in FIG. 6, the present embodiment differs from the first embodiment in that the non-joining surface 50B of the joint flange 50 does not intersect with the vehicle width direction inner surface 38X of the inner side wall 38. Other configurations are substantially the same as those of the first embodiment. Thus, components substantially the same as those of the first embodiment are denoted by the same reference signs, and the description thereof will be omitted.

A frame body 82 of a rear side member 80 serving as the vehicle body frame member of the present embodiment is configured substantially the same as the frame body 32 (see FIGS. 3A and 3B, etc.) of the first embodiment except for the points described below. The frame body 82 is provided with a recess-shaped portion 84 provided directly below the recess 48 so as to open inward in the vehicle width direction. The recess-shaped portion 84 is recessed outward in the vehicle width direction with respect to the vehicle width direction inner surface 38X of the inner side wall 38. An inner surface of the recess-shaped portion 84 has a first surface 84A at an upper end thereof, a second surface 84B at a lower end thereof, and a third surface 84C at an outer end thereof in the vehicle width direction. The first surface 84A faces downward, the second surface 84B faces upward, and the third surface 84C faces inward in the vehicle width direction. The first surface 84A of the recess-shaped portion 84 is continuous and flush with the non-joining surface 50B of the joint flange 50. In other words, the joint flange 50 is formed of a portion that extends inward in the vehicle width direction from an intermediate wall 86 that serves both as a lower part of the recess 48 and an upper part of the recess-shaped portion 84.

Also in the present embodiment, the space inside the recess 48 can be used as a space for accommodating variations in dimensions and arrangement position of the center floor panel 16 and the like, as in the first embodiment. The length of the joint flange 50 of the rear side member 80 in the vehicle width direction can be reduced, and the restrictions on the parts layout can also be reduced.

Supplementary Description of Embodiments

In the above embodiments, the rear side members 30, 60, 70, 80 shown in FIGS. 1 to 6 and each serving as the vehicle body frame member are provided with the joint flange 50 and recesses 48, 66. However, the vehicle body frame member provided with the flange and the recess may be other vehicle body frame members such as the rocker panel 20 (see FIG. 1) having a closed cross section.

Further, in the above embodiments, the rear side members 30, 60, 70, 80 each serving as the vehicle body frame member are made of an aluminum die-casting material. However, the vehicle body frame member may be other vehicle body frame members such as a member formed by joining a plurality of steel panels.

Further, in the above embodiments, the joining surface 50A of the joint flange 50 is the upper surface of the joint flange 50. However, a configuration may be adopted in which a lower surface of the joint flange serves as a joining surface on which the end of the floor panel in the vehicle width direction is stacked and to which the end of the floor panel is joined to. For example, a configuration may be adopted that is obtained by vertically inverting the configuration indicated by a solid line in FIG. 2.

Further, as a modification of the first, second, and fourth embodiments shown in FIGS. 2 to 4B and FIG. 6, a bulkhead may be disposed inside the frame body 32, 62, 82. Further, as a modification of the third embodiment shown in FIG. 5, the following configuration may be adopted, in addition to the configuration of the third embodiment or in place of the second rib 76 of the third embodiment. That is, a second rib that is raised from one or both of the upper surface 40Y1 and the lower surface 40Y2 of the protruding surface 40Y of the recessed wall 40W may be provided so as to extend along the direction of extension of the frame body 72 and integrally connect the first ribs 74 adjacent to each other. Further, as a modification of the third embodiment, other ribs such as ribs forming a honeycomb structure may be provided inside the frame body 72, instead of the first ribs 74 and the second rib 76.

The above-described embodiments and modifications may be appropriately combined to be implemented.

Examples of the disclosure have been described above. However, the disclosure is not limited to the above, and needless to say, various modification may be made to carry out the disclosure without departing from the scope of the disclosure.

What is claimed is:

1. A vehicle body lower part structure comprising:
a floor panel disposed in a lower part of a vehicle body; and
a vehicle body frame member including
a frame body provided on a side of the floor panel in a vehicle width direction, extending along a vehicle front-rear direction, and having an open cross section or a closed cross section,
an inner side wall provided at an inner end of the frame body in the vehicle width direction and extending along a vehicle up-down direction and the vehicle front-rear direction,
a joint flange projecting inward in the vehicle width direction from an inner surface of the inner side wall in the vehicle width direction, having a thickness in the vehicle up-down direction, and having a joining surface on which an end of the floor panel in the vehicle width direction is stacked and to which the end of the floor panel in the vehicle width direction is joined, and
a recess provided to the frame body, recessed outward in the vehicle width direction from the inner surface of the inner side wall in the vehicle width direction, and having a surface that is continuous and flush with the joining surface of the joint flange.

2. The vehicle body lower part structure according to claim 1, wherein a non-joining surface that is on an opposite side of the joint flange from the joining surface intersects the inner surface of the inner side wall in the vehicle width direction.

3. The vehicle body lower part structure according to claim 1, wherein:
the recess is a recessed bead;
the recessed bead has, on an inner side of the recessed bead in the vehicle width direction, an intersection line where two surfaces of the recessed bead intersect;
the intersection line extends along a direction of extension of the frame body from an end to the other end of the frame body in the direction of extension; and
the recessed bead has, on an outer side of the recessed bead in the vehicle width direction, a portion provided with a ridge line extending along the intersection line.

4. The vehicle body lower part structure according to claim 1, wherein:
the vehicle body frame member is made of an aluminum die-casting material; and
the vehicle body frame member includes
a plurality of first ribs arranged side by side in a direction of extension of the frame body, the first ribs each extending along the vehicle up-down direction and integrally connecting a protruding surface of the recess and a surface inside the frame body other than the protruding surface, the protruding surface being on an opposite side of a recessed wall from a recessed surface, and the recessed wall constituting a part of the recess outward of the inner side wall in the vehicle width direction, and
a second rib raised from the protruding surface, extending along the direction of extension of the frame body, and integrally connecting the first ribs adjacent to each other.

* * * * *